United States Patent [19]

Paetsch

[11] 4,364,024
[45] Dec. 14, 1982

[54] SIGNATURE PRESENTATION METHOD AND APPARATUS

[75] Inventor: Karl Paetsch, Roesrath, Fed. Rep. of Germany

[73] Assignee: International Business Machines Corporation, Armonk, N.Y.

[21] Appl. No.: 101,291

[22] Filed: Dec. 7, 1979

[51] Int. Cl.³ .................. B41J 3/00; H04N 1/00
[52] U.S. Cl. ................. 340/146.3 SY; 101/93.04; 340/146.3 H; 358/260; 358/296; 364/900
[58] Field of Search ............ 358/260, 93, 296; 340/146.3 AC, 146.3 H, 146.3 SY; 364/200 MS File, 900 MS File; 101/93.04; 355/14 C; 346/94, 95, 98; 178/30

[56] References Cited

U.S. PATENT DOCUMENTS

| | | | |
|---|---|---|---|
| 3,201,512 | 8/1965 | Mason et al. | 340/146.3 AH |
| 3,582,884 | 6/1971 | Shepard | 340/146.3 H |
| 3,632,867 | 1/1972 | Markow | 358/260 |
| 3,718,908 | 2/1973 | Bloomstein | 340/149 A |
| 4,020,463 | 4/1977 | Himmel | 340/146.3 AE |
| 4,024,506 | 5/1977 | Spaargaren | 101/93.04 |
| 4,028,733 | 6/1977 | Ulicki | 364/900 |
| 4,068,224 | 1/1978 | Bechtle et al. | 178/30 |
| 4,074,254 | 2/1978 | Belser et al. | 364/900 |
| 4,100,580 | 7/1978 | Groothuis | 358/260 |
| 4,101,959 | 7/1978 | Domike et al. | 364/200 |
| 4,125,873 | 11/1978 | Chesarek | 364/900 |
| 4,150,400 | 4/1979 | Wong | 358/260 |
| 4,186,415 | 1/1980 | Takayama | 358/260 |

FOREIGN PATENT DOCUMENTS 1558458  6/1977  United Kingdom .

Primary Examiner—Leo H. Boudreau
Attorney, Agent, or Firm—Karl O. Hesse

[57] ABSTRACT

Signature image information is converted from scanner input data into lines of character spaces which can conveniently be presented on a matrix printer. Both the method of image conversion from input scans to output lines of characters and apparatus for interpreting control information accompanying character picture element information are disclosed. An efficient format for presenting the control information and reducing the amount of picture element data stored and handled is also disclosed.

3 Claims, 8 Drawing Figures

SIGNATURE PRESENTATION METHOD AND APPARATUS

TECHNICAL FIELDS

The invention relates to systems including methods and apparatus for storing and retrieving image information for verifying the identity of a person conducting a financial transaction. Although other methods of verifying the identity of a person including memorized personal identification numbers and identification cards assist in verifying that a person really is the party authorized to execute the financial transaction, customs and laws often presume the comparison of the person's signature with the signature previously provided by the authorized party.

BACKGROUND ART

U.S. Pat. Nos. 3,718,908 and 4,020,463 are both directed to storage, retrieval and presentation of a signature image at the point of execution of a transaction in order to assist the clerk or teller in accurately verifying the identity of the other party to the transaction. Recognizing the transitory nature of display signature presentations and the existance of a printer at many terminal stations, improved all points addressable matrix printers have been suggested for use in displaying graphic images such as signatures. Capitalizing on modern technology, these printers usually are controlled by a microprocessor which generates each character from one or more read only memory chips containing the seven or eight wire bit patterns, also called slices, necessary to generate each character of one or more character fonts. By receiving each print wire control bit directly from a host computer or mass storage rather than referring to a read only memory character generator, these printers can print virtually any image within the constraint of the paper carriage without other limits as to shape or size of the images.

Although these matrix printers may be controlled by a microprocessor, and therefore be very flexible, the mechanics of a matrix printer is oriented to printing rows of characters in sequence like a typewriter. Accordingly, it is important to provide the image information to the print control logic or microprocessor in such sequence and format so as to permit full speed operation of the mechanical printer hardware to avoid unduly delaying the financial transaction being executed. Further, image information is often collected and stored as a plurality of sequential horizontal scans of video data. Matrix printers in contrast accept vertical columns of 7 or 8 picture elements, 5 to 8 columns being combined to create each character as the print head moves along the line of characters being printed.

DISCLOSURE OF THE INVENTION

Accordingly, it is an object of the invention to provide improved method and apparatus for efficiently presenting an image to persons executing a financial transaction:

A further object of the invention is to provide the information needed by a vertical slice character oriented output device in the sequence of use by the device.

It is a still further object of the invention to permit the output device to move rapidly across portions of the image field which do not contain parts of the image thereby speeding up presentation of the image.

It is an even further object of the invention to define the information of the image in a variable size field thereby even further speeding the complete presentation of the image.

It is an additional object of the invention to provide an announcing block of information preceding each group of image slice information thereby permitting the output device to skip those character positions into which no picture elements of the image being presented fall.

These and other objects of the invention which will become apparent upon a detailed reading of the specification in light of the drawings are accomplished by organizing the picture elements constituting the image to be presented in a plurality of rows of slices corresponding to lines of alphanumeric characters wherein the slices include picture elements in the blank areas normally remaining in lines and between lines of alphanumeric characters.

BEST MODE FOR CARRYING OUT THE INVENTION

Figure 1:
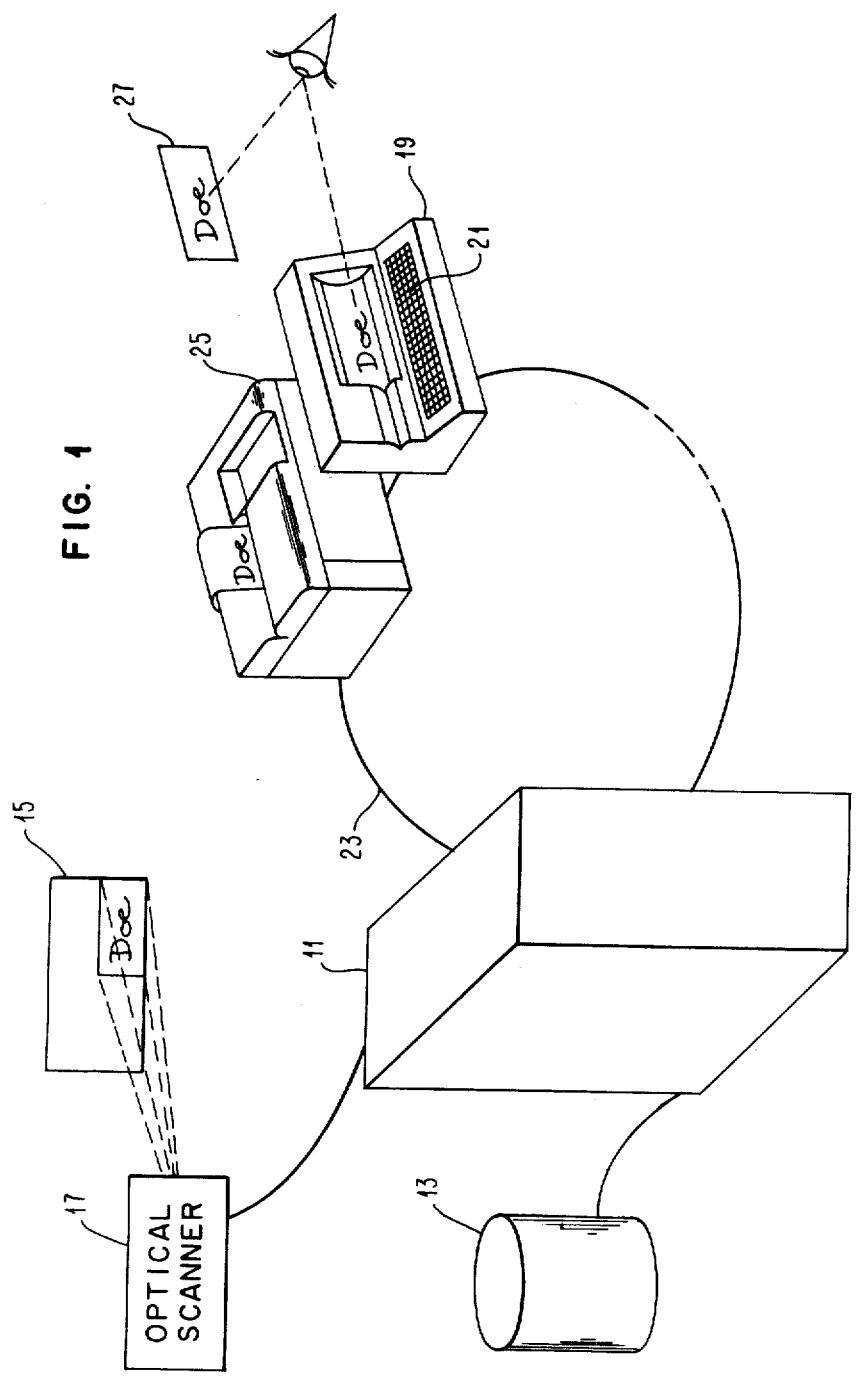
FIG. 1 shows an image storage and presentation system including two types of output devices.

Referring to FIG. 1, an image storage and presentation system is set forth including a computer 11 and a disk file 13. Each image to be later retrieved is presented to the system in a predetermined field of an input document 15 such as a credit or financial account application. Optical scanner 17 scans the predetermined field of input document 15 and stores each picture element of the field in a buffer. It is advantageous to scan the input document field at a picture element density greater than the output picture element density that will be used. Higher density input document scanning permits use of one or more data reducing algorithms which have the effect of making a signature more readable and reducing spurious noise picture elements. After the data has been reduced, it may be compacted using the formatting algorithms which will be described with respect to FIG. 2 or alternately other compaction algorithms such as run length encoding may be employed to most efficiently utilize storage space on disk 13. It has been found that the amount of compaction inherently provided by the formatting method of the instant invention on signature images provides approximately comparable or better compaction ratios than other well known compaction schemes and therefore storage of the images on disk 13 in the same format as they will be presented at an output terminal has been found to require the least computer time. Other images including Kata Kana may be more advantageously stored using other compaction methods with conversion to the format of the invention being accomplished at terminal 25. Conversion at printer terminal 25 would also be advantageous if display terminal 19 directly utilizes signature image information stored on disk 13 in some other compaction method.

After a plurality of signature images have been stored on disk 13 and the system has been put into operation, a terminal operator such as a bank teller may retrieve one or more signatures from a remote terminal location. It is contemplated that a retrieval includes an identification action such as entering a customer's account number at a keyboard 21 of a keyboard display terminal 19. The identifying account number is sent to computer 11 along with other information such as the amount of the transaction etc. via communication link 23. Link 23 may often be a simple coaxial cable or twisted pair of wires permitting teller stations at a bank to be connected to a computer located in a different part of a bank building.

The account number portion of the message is translated by computer 11 into a disk track and record address using well known information retrieval methods and the corresponding signature data is read into the memory of computer 11 for transmission to terminal 19 and/or 25 as part of the response message. Transmission of the image can begin immediately while computer 11 is performing any additional credit checks and balance comparisons utilizing the amount of transaction information. Being oriented to a vertical slice presentation, the formatting method of the invention is ideally suited for presentation at an output matrix printer such as printer 25. An operator or teller may then compare the signature on a transaction document such as the check with the presented image of the original signature from application 15 to determine whether adequate similarities exist to verify the identity of the party presenting the transaction document 27.

Figure 2:
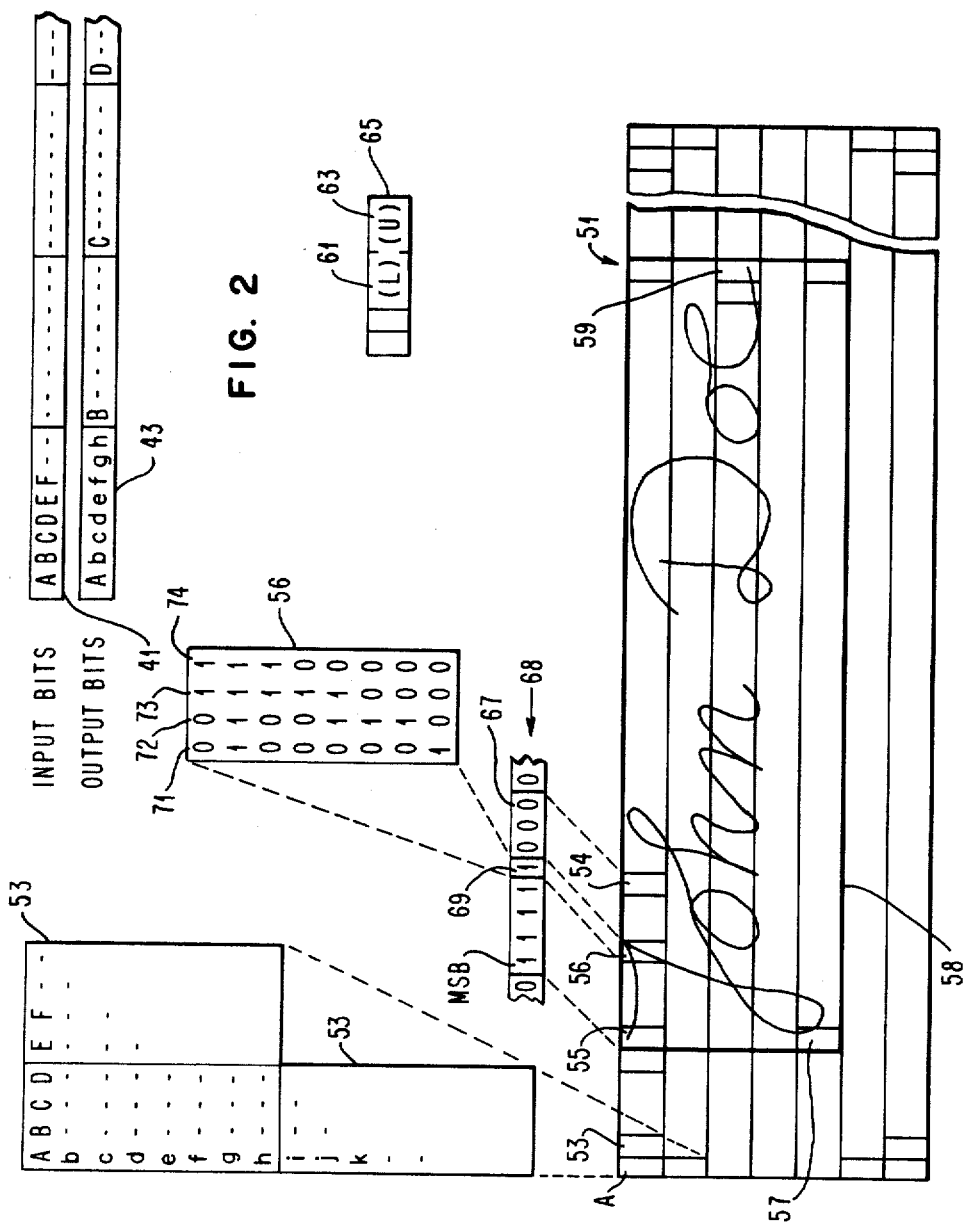
FIG. 2 shows the relationship of fields of information into which an image will be formated.

Referring now to FIG. 2, a more detailed description will be set forth of the formatting method of invention. The bottom portion of FIG. 2 shows an example signature as might be received on an application document 15 of FIG. 1. This signature is scanned by the optical scanner 17 in either a plurality of horizontal raster lines or a plurality of vertical raster lines. Horizontal scanning has been assumed and it is also assumed that the scanner does not provide leading scans which are all white space picture elements. Accordingly, a map of picture elements 51 representing darker and lighter spaces of the signature field is created in a buffer memory with the signature near the top of the imaginary map of picture elements 51. Actually, the picture elements ABCDEF . . . constitute the first byte of the first scan across the top of map 51 and subsequent bytes are stored at sequential storage addresses. Assuming that the output unit accepts picture elements on 0.016 in. centers, the scanner 17 would scan the original document at some higher density such as 0.008 or 0.004 in. picture element centers. This increased density of picture elements, of course, multiplies the amount of buffer memory needed to store the image. It is advantageous after scanning the input document to reduce the number of picture elements to the density acceptable by the output device, while still yielding a signature of substantially normal size. It is, of course, possible to transmit each scanned picture element directly to the output device without data reduction yielding a magnified output image of the original signature. Presentation of the scanned picture element without reduction however, does make the output image significantly larger, requires significantly more communication time and if a log is being maintained on printer 25 of each transaction, each signature requires a significantly greater portion of the paper tape log. Moreover, comparison is not significantly improved by magnification. Accordingly, it has been found that presentations of the signature at substantially original size or slightly larger is the most practical in a real transaction environment.

An example picture element reduction method which has been found to be acceptable is to group original scan picture elements for conversion into a single output picture element. For example, when converting from a 0.008 input picture element spacing to a 0.0166 output picture element spacing, four adjacent input picture elements defining the four corners of a rectangle are reduced to a single output picture element. Using this example of 4 to 1 data reduction, the output signature can be made thinner by requiring that all four input picture elements represent a dark space in order that the output picture element be a dark space. On the other hand, it has been found that a signature printed by a matrix printer is very readable if a print wire is fired when any two of the four scanned picture elements in each group of four represent dark space. If the original input signature is quite thin, it can be made heavier by permitting an output picture element to represent a dark space when any one of the four scan picture elements are dark space elements. Because the data reduction just described occurs only once immediately after the sample signature is received from input document 15, it is practical to have this portion of the operation monitored by an operator who may select whether 1, 2, 3 or 4 scanned picture elements shall represent an output picture element depending upon the quality of image obtained from the input sample of document 15. Equivalently, when converting from 0.004 input picture element spacing to a 0.0166 output spacing, the reduction factor is 16 to 1 and the selection of how many of dark input elements shall represent one dark output element ranges from 1 to 16.

Once the scanned picture elements have been reduced to the desired output picture density, programs in computer 11 are invoked to convert them to character spaces, locate the edge character spaces and identify these character spaces having picture elements of the signature. As shown in FIG. 2, the imaginary bit map 51 is considered to be divided into character spaces 53 each including four bytes of information. Each dark space output picture element in a character space 53 is represented by a binary one bit and each light space picture element is represented by a binary zero bit. Since each byte in a character space 53 is oriented in a vertical fashion across a portion of the signature image, each byte can be used directly to actuate the wires of a matrix printer without further translation or conversion. However, recall that it was assumed that scanner 17 provided a first byte comprising bits ABCDEF . . . while we desire that the two bytes consisting of bits Abcdefg and B . . . be stored as sequential byte addresses for output. Expressed in words, the input data in buffer memory in computer 11 is in the form of one thousand five hundred and sixty-eight bytes in sequential storage addresses, each byte representing eight horizontal picture elements, each twenty-eight sequential bytes containing the picture elements of each of fifty-six horizontal scans. Accordingly, the input bit stream 41 of FIG. 2, is converted by the method of FIG. 3, into the output bit stream 43. After conversion, the buffer memory in computer 11 again contains one thousand five hundred and sixty-eight bytes in sequential storage addresses, each byte representing the eight picture elements of each vertical slice of each of fifty-six character spaces in each of seven rows of character spaces 53 as shown in the imaginary bit map 51 of FIG. 2. After having converted the contents of the buffer memory in computer 11 from horizontal scan orientation to vertical character space slice or dot byte orientation, another program in computer 11 examines each four bytes of each character space in sequence as set forth in FIG. 4 in order to locate the image edge character spaces. Having located the edge character spaces 55, 57 and 59 in FIG. 2, it is known that 5 lines of thirty-six character spaces each is the minimum rectangular matrix of character spaces capable of containing the entire signature image of the example of FIG. 2. Because it was desired in this embodiment to store the matrix size as a single byte, a three bit number L representing the number of lines of print character spaces required for the signature image was assigned to field 61 of guide byte 65. A second three bit field 63 was reserved for defining the length of the matrix in character spaces divided by 8 therefore, field 63 represents the number of print character spaces in each line of character spaces expressed in space units U. Each space unit includes 8 character spaces. Each character space is represented by a corresponding blank indicator bit position. Each blank indicator bit serves to announce to the output device that a corresponding group of four data bytes defining an image character space may, or may not be skipped. For example, the 8 character spaces 54-55 comprise one space unit and correspond to blank indicator bit byte 67. The most significant bit of blank indicator bit byte 67 is a binary one bit because character space 55 includes a portion of the signature image. On the other hand, the least significant bit of blank indicator bit byte 67 is a binary zero bit because character space 54 has no portion of the signature image but represents only white space picture elements.

Character space 56 is associated with blank indicator bit 69 as shown in FIG. 2. Because character space 56 contains a portion of the signature image, blank indicator bit 69 is a binary one bit. The four slices of output picture element information are shown above the blank indicator bit 69 as an example of a slice dot data byte which will be sent to the output device such as the wire drivers of a matrix printer. Vertical byte 71 would be sent to the print wires first followed by bytes 72, 73 and ending with byte 74, assuming a left to right motion of the head. Since some printers can move in either direction, it may be that slice 74 will be printed first followed by slices 73, 72 and 71.

Figure 3:
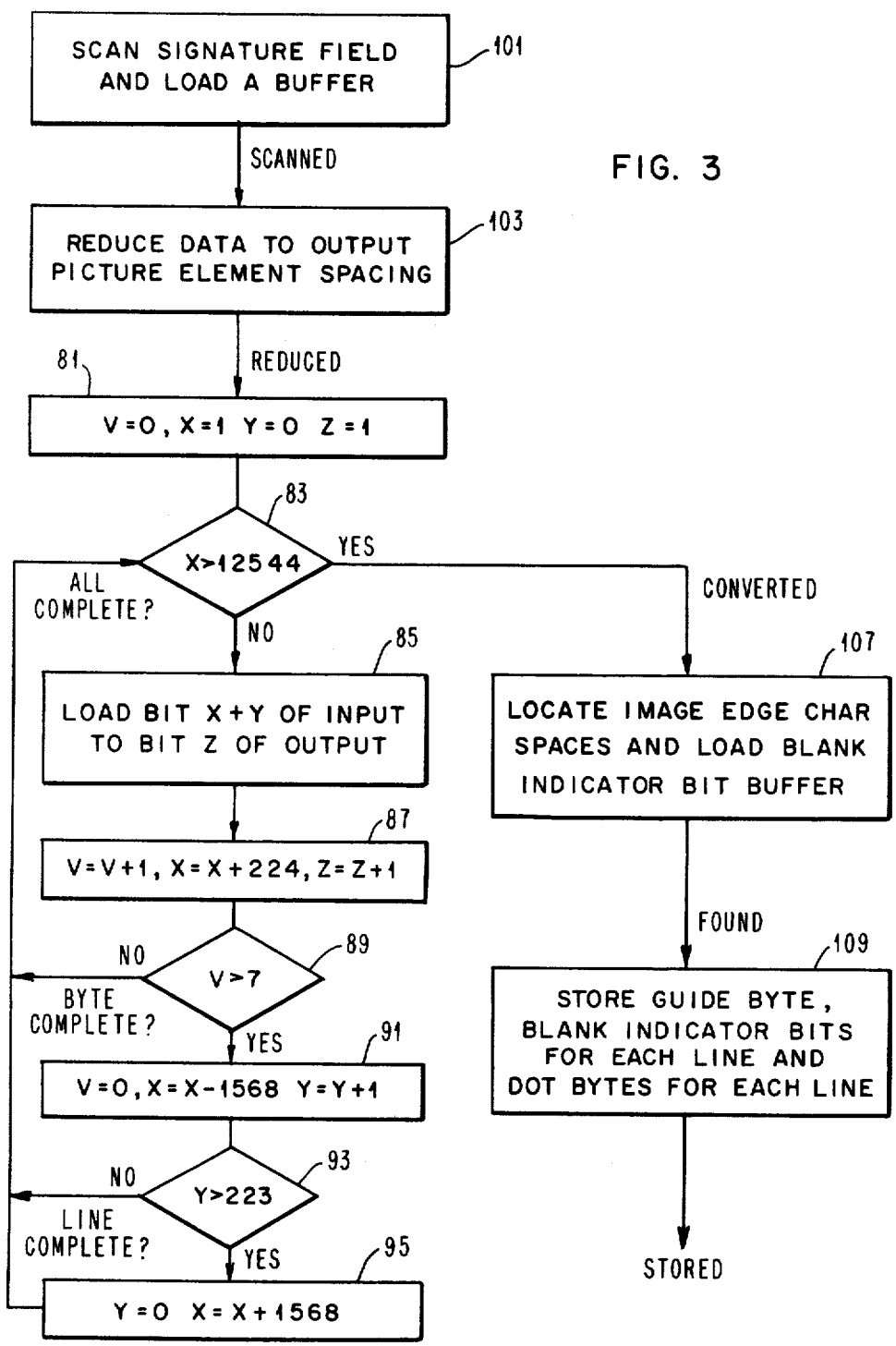
FIG. 3 is a flow diagram setting forth the method of information formatting in accordance with FIG. 2.

FIG. 3 shows a flow diagram of the steps executed by computer 11 when storing a signature image on disk 13. First the signature field of an input document 15 is scanned and a buffer is loaded with the image of the document at 101. As previously described the higher density scan picture elements will be reduced to the output picture element spacing at 103 such as for example, requiring that two out of a group of four scan picture elements be representative of dark space in order to make the corresponding output picture element a dark space element.

After reducing the scan data to the output picture element density, the bytes in the buffer memory of computer 11 stored sequentially as shown at 41 of FIG. 2 must be converted to sequential storage as shown at 43 of FIG. 2. Conversion may be accomplished in accordance with the flow diagram of FIG. 3, steps 81-95. At action block 81, input bit counter X is initialized to 1, slice counter Y is initialized to 0, output bit counter Z is initialized to 1, and bits per slice counter V is initialized to 0. Bits per slice counter V controls the loop including action blocks 85, 87 to select the eight bits, for example Abcdefgh, from each of eight scans to generate one vertical slice or dot byte in the first byte position of the output bit stream 43. As mentioned earlier, the input bit stream 41 is taken from the input scan buffer in computer 11 whereas the output bit stream 43 is stored in a separate fifteen hundred sixty-eight byte output buffer, hereafter referred to as buffer 43. At decision block 83, input bit counter X is tested to determine whether all twelve thousand five hundred and forty-four input bits have been converted. If not, bit X plus Y of the input buffer is loaded into bit Z of the output buffer. For the first pass through this loop, X is 1 and Y is 0, therefore the first bit A, of the input bit stream 41 is loaded into the first bit position of the output buffer 43. At action block 87, the input bit stream counter X is incremented by two hundred and twenty-four to access the first bit position of the next scan line. Output bit counter Z is incremented by 1 and the bits per slice counter V is incremented by 1. At decision block 89, the bits per slice counter is checked for greater than seven indicating completion of a slice byte or picture element dot byte. Since V equals 1 and X equals two hundred and twenty-five, action block 85 regains control and transfers the two hundred and twenty-fifth bit b from the input bit stream 41 to the second bit position of the output buffer 43. This loop continues for eight passes when action block 91 gains control. At action block 91, the second byte of the output bit stream is to be generated and therefore, the bits per slice counter V is reinitialized to zero. Because the second slice also contains bits from the first eight scans, the input bit stream counter must be backed up to 1 by subtracting fifteen hundred sixty-eight. In order to start the second slice of the output bit stream with the second bit position of the input bit stream, slice counter Y is incremented by 1. Since slice counter Y is now equal to 1, decision block 93 returns control to action block 85 where the second bit B of the input bit stream is loaded into the ninth bit position of the output bit stream beginning the second output dot byte. After the first eight scan lines of the input bit stream 41 have been converted into two hundred and twenty-four dot bytes, decision block 93 transfers control to action block 95 where the slice count Y is reset to zero and the input bit stream count X is returned to its condition at action block 87 by adding the count fifteen hundred sixty-eight previously subtracted at action block 91. Control is then returned to action block 85 to permit the fifteen hundred and sixty-ninth bit, i in FIG. 2, of the input bit stream to be loaded into the two hundred and twenty-fifth dot byte of the output buffer 43. The above described procedure continues for the six remaining lines of character spaces at which time X will have incremented to twelve thousand five hundred forty five and the conversion from horizontal scan lines to lines of vertical dot bytes will have been completed.

Having reduced the scan data to the output picture element density and having converted the horizontal scans to lines of vertical dot bytes, the image character edge spaces are located at action block 107. By way of example, logical steps which may be utilized to locate the edge character spaces and lines are set forth in the flow diagram of FIG. 4. The edges of the image are the top and bottom lines and the right and left character spaces defining a rectangle 58 of FIG. 2 containing the entire image. While stepping through each byte of the dot data byte stream 43 in order to find the image edges, a binary one bit is stored in a blank indicator bit buffer 68 corresponding to each character space containing a portion of the image.

After finding the edge character spaces of the image and having loaded the blank indicator bit buffer, all information is ready for storage on disk 13 which is accomplished at 109. The method of step 109 is shown in greater detail in FIG. 5.

Figure 4:
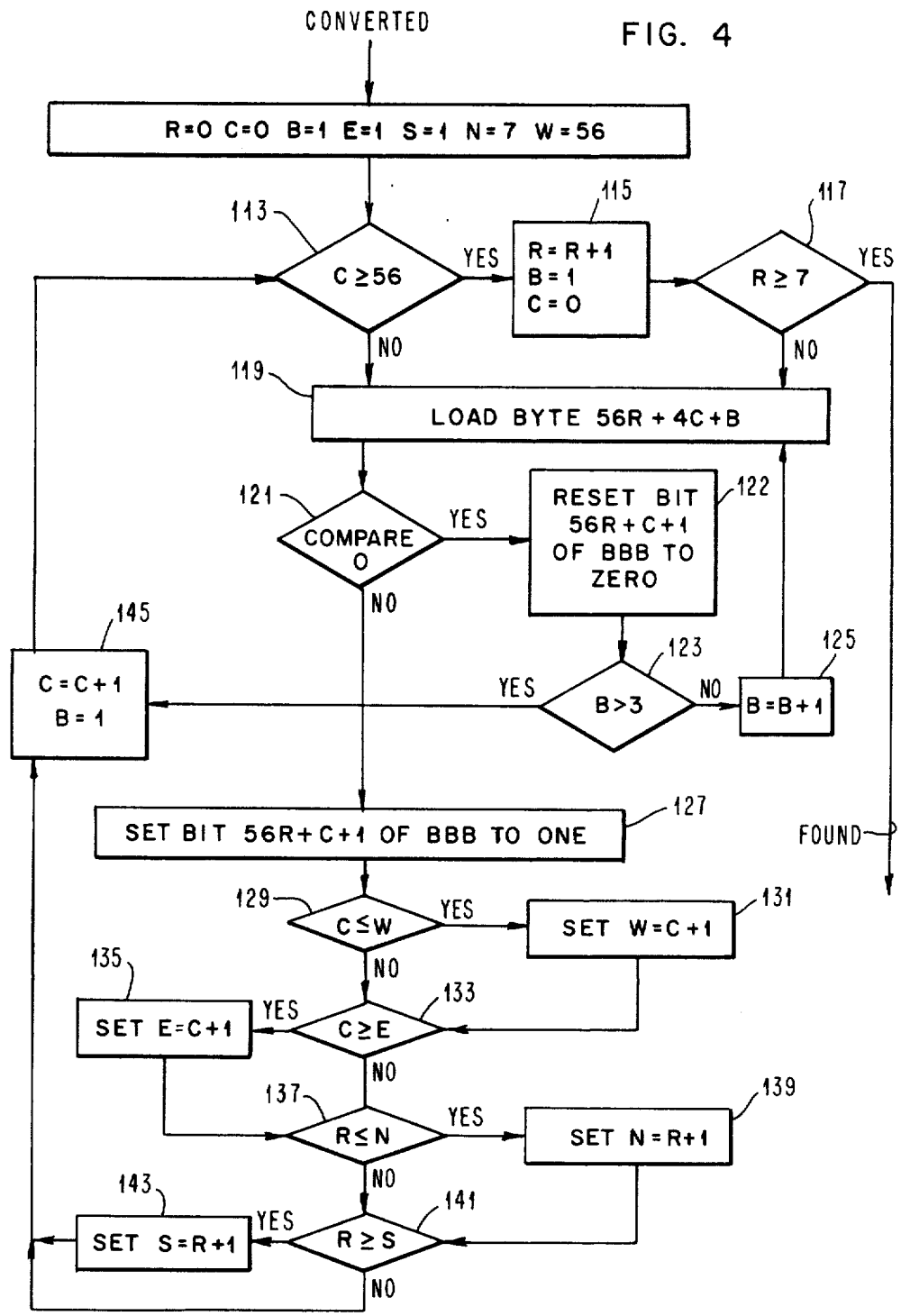
FIG. 4 is a flow diagram of a method of finding edges of the signature image.

Referring to FIG. 4, an example detail method for locating the image edge character spaces and loading the blank indicator bit buffer 68 is set forth as a flow diagram. This flow diagram as well as those of FIGS. 3 and 5 can be implemented either as a program in computer 11 or as logic circuits. In view of the fact that these methods need only be executed once for each identification card holder, and accordingly, speed is not imperative, a program in computer 11 will usually be found to be the preferred embodiment. In the event that these methods are implemented at terminal 25, and executed each time a signature is presented, they would preferably be implemented as logic circuits or in read only storage of a microcomputer.

In order to execute the method of FIG. 4, several single byte buffers and a forty-nine byte blank bit buffer BBB must be defined. The BBB has three hundred and ninety-two bits, each bit corresponding to one of the character spaces of seven rows of fifty-six character spaces. Since each bit of the BBB is reset or set depending upon whether its corresponding character space is all blank or contains picture elements, it must be addressable on a bit by bit basis. The single byte buffers are given single alphabetic letter names. R, B and C each define a number corresponding to the current line or row, byte, and character space of the buffer 43 being investigated. In addition to R, B and C, four single byte buffers to store the top, bottom, left and right, image edge character spaces are needed. These image edge character spaces are designated as North N, South S, West W and East E for convenience in drawing FIG. 4.

Referring then to FIG. 4, execution control enters from the top to action block 111 which causes R and C to be set to zero, B, E, and S to be set to one, N to be set to seven and W to be set to fifty-six. At decision block 113, it is determined whether the last character space of a row has been reached. If yes, the row count R is incremented and the character space count C is set to zero and byte count B is set to one at action block 115. The row count R is then investigated at decision block 117 for completion of the last row. If yes, the whole signature field has been checked, the image edge character spaces have been found and this step is complete.

More usually, the last character space of a row or the last row have not been reached and the method proceeds to action block 119 wherein the next byte representing the slice indicated by the row, character space and byte counts is loaded for comparison with a zero byte in decision block 121. If the byte is a zero, the bit fifty-six R+C+one of the blank bit buffer 68 (BBB) is set to zero at action block 122. If this is not the last byte of a character space as decided at block 123, the byte count is incremented at 125 and the next byte is loaded at 119 from buffer 43 of FIG. 2. In the event that the byte is not an all zero byte, but contains a binary one bit representing a dark space portion of the image, decision block 121 leads to action block 127 wherein a binary one bit is set in bit position fifty-six R+C+one of the blank bit buffer BBB corresponding to the character space currently being investigated. Having set the blank bit, the character space count is compared with the West edge count W in block 129 and if C is less than or equal to the West edge count, the West edge is set equal to the character space count C plus one in action block 131. The character space count C is then compared with the East edge count E at decision block 133 and if C is found to be greater than or equal to the East edge, the East edge count E is set equal to the current character space count C plus one in action block 135. Thereafter, the row count R is compared with the North edge count N at decision block 137 and if R is found to be less than or equal to N, N is set equal to R plus one. This action will only occur, at most, once for each image. We have chosen row by row scanning from the top down and therefore once having encountered the top edge of the image, the North character space count will always be less than succeeding row counts R. Finally, the row count R is compared with the bottom or South edge count at decision block 141 and if R is greater than or equal to S, S is set equal to R plus one at action block 143. Having tested the W, E, N, S character space counts against the current space count which was found to be a dark space, the byte count is again set to one and the character space C is incremented at action block 145 to get the first byte of the next character space.

The steps described immediately above are repeated until all of the character spaces C in all of the rows R have been investigated. It should be noted that not all of the bytes of each character space need be investigated because if any byte of the four within a character space is found to contain a binary one bit indicating a dark picture element, the entire character space is considered to be an image character space and the four bytes will be sent to the output device.

Figure 5:
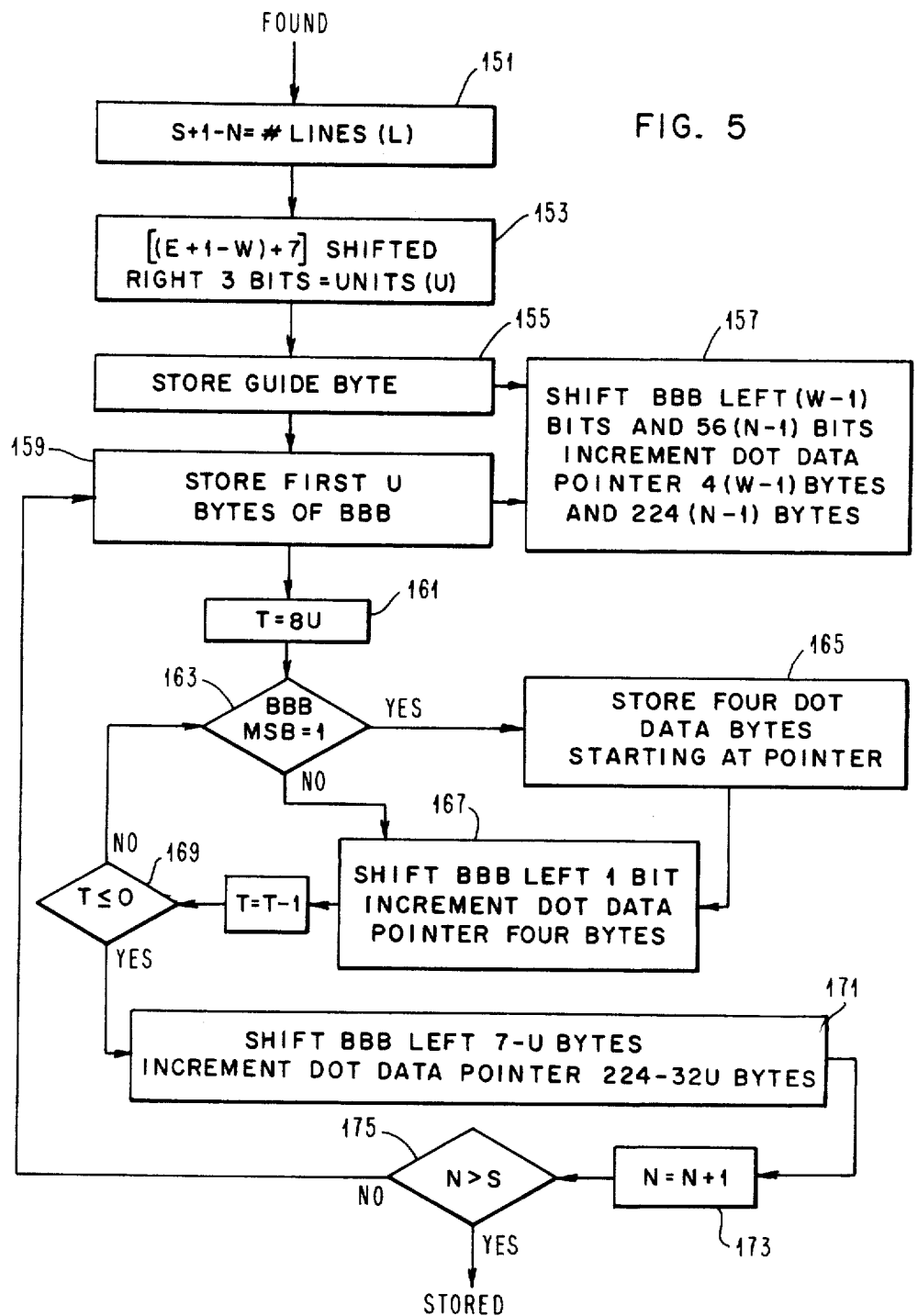
FIG. 5 is another flow diagram of the method of removing from the output data, bytes of picture elements which do not contain a part of the signature.

Referring now to FIG. 5, the detailed steps required to execute the functions of block 109 in FIG. 3 are shown in greater detail. Execution of the steps of FIG. 5 is entered from the top to action block 151. Having found the N and S image edge character spaces, the N count is subtracted from the S plus one count to get the number of lines L of character spaces required for the image. Having calculated the number of lines at block 151, the number of character spaces required for each row is determined at block 153. Because it was determined that character spaces should be stored as a number of space units U, each space unit corresponding to eight character spaces, the number of character spaces must be chosen in bytes. In order to obtain the number of bytes of character spaces, the W count is subtracted from the E plus one count and the number seven is added in preparation for division by eight in order to obtain the number of bytes as an integer. Division by eight can be accomplished by shifting the resultant sum to the right three times. The number of lines L and number of space units U found at blocks 151 and 153 are stored in the guide byte 65, the format of which is shown in FIG. 2. After storing the guide byte in a disk output buffer at action block 155, the blank bit buffer BBB is shifted to the left W minus one times and again shifted to the left fifty-six (N minus one) times to remove those zero blank bits corresponding to the blank character spaces above and to the left of the image in imaginary bit map 51. Six bits will be shifted out of BBB 68 because W minus one equals six and N minus one equals zero in our example of FIG. 2. Likewise, the address pointer to the dot data in buffer 43 is incremented four (W minus one) times and two hundred and twenty-four (N minus one) times to skip over the blank character spaces to the left and top of the image in the buffer. Performing these increments in effect skips over the blanks above and to the left of the first row of image character spaces in buffer 43. Having moved the pointer to the upper left hand corner of the signature image field 58 and having removed the blank indicator bits in the blank bit buffer 68, the first U bytes in the blank bit buffer can be stored in the disk output buffer at 159. In preparation for checking each blank indicator bit corresponding to a character space in a line or character spaces, a count T is set equal eight times U at block 161 which is the number of character spaces in each line of character spaces containing a portion of the image. At decision block 163, the most significant bit of the blank bit buffer is tested for a binary one bit. If yes, the four bytes at and following the dot data buffer pointer is stored in the disk output buffer.

After storing the four most significant bytes of dot data at action block 165, or after finding the most significant bit of the blank bit buffer to be a binary zero indicating that this character space contains no portion of the image, the blank bit buffer is shifted one position to the left at action block 167. The left shift causes the most significant bit to be lost and replaced by the next lower order bit. Likewise, the pointer to the dot data in buffer 43 is incremented four byte positions. The four byte increment moves the pointer to the next four bytes of data. After having shifted the blank bit buffer and incrementing the dot data buffer 43 pointer, the looping count T is examined at decision block 169 for being equal to or less than zero. If equal to or less than zero, each four bytes representing a character space in a line of characters has been either transferred to the disk output buffer if the blank indicator bit was a binary one or skipped if it was zero. If T is greater than zero, control returns to decision block 163 where the steps 165 and 167 are repeated until the entire line of dot data bytes representing a portion of the image have been stored. After having moved the dot bytes corresponding to the character spaces of a single line to the disk output buffer, action block 171 causes the blank bit buffer 68 to be shifted seven minus U bytes to the left. Likewise, the dot data pointer is incremented two hundred and twenty-four minus thirty-two times U bytes. These actions cause the zero blank indicator bits and zero dot data bytes symbolically located to the left of the image in buffer 43 to be skipped in buffer 43 and shifted out of the blank bit buffer 68. The most significant bit of the blank bit buffer and the byte at the pointer in buffer 43 now contain information pertinent to the next following line of characters. Having stored the upper most line of character spaces, the upper edge character space count can be incremented by setting N equal to N plus one at action block 173. Having incremented N, N is compared for being greater than S at decision block 175. If N is not greater than S, additional lines of image character spaces must be stored and control is returned to action block 159. If N is greater than S, all of the lines of character spaces containing a portion of the image have been stored in the output buffer and can be transferred to disk 13 while control is returned to the operating system program of computer 11 which may then permit the operator to cause another signature to be scanned by optical scanner 17 repeating the entire procedure for that signature image.

Figure 6:
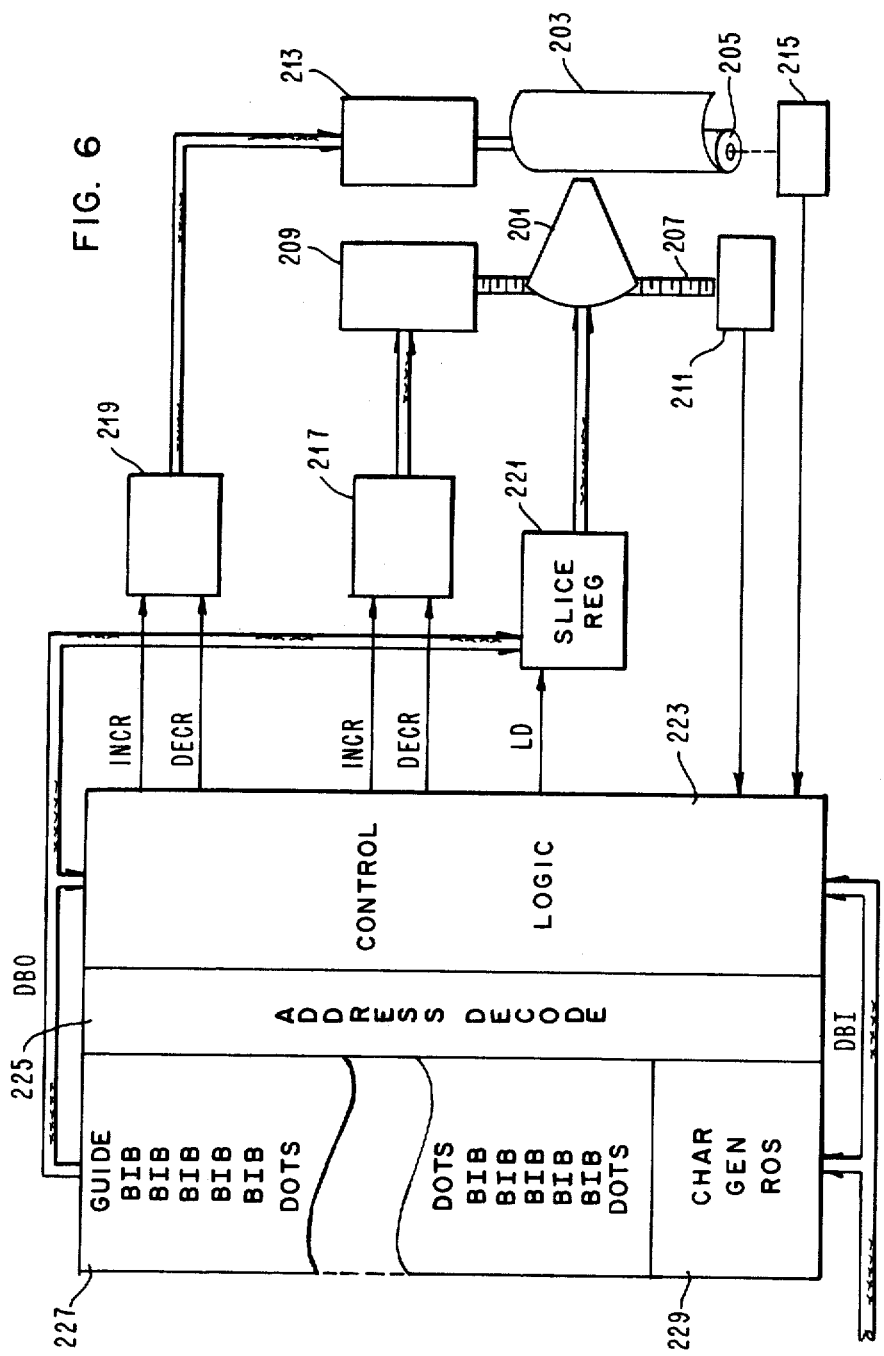
FIG. 6 shows apparatus of an example output device for receiving the formatted information in accordance with the invention and efficiently creating an output presentation.

Having stored at least one image of a signature on disk 13 of FIG. 1, attention is now directed to terminals 19 and 25 for presenting a reproduction of the image of a signature to a terminal operator for comparison with a transaction document containing a signature. FIG. 6 shows hardware details within print terminal 25 for presenting the signature image on a printed journal log. Wire print head 201 includes eight print wires alligned vertically one above each other for simultaneously printing a vertical eight picture element slice of a character. Printing is accomplished on paper 203 supported by platen 205. Print head 201 is moved horizontally by lead screw 207 driven by stepper motor 209. Feedback from lead screw 207 is provided by emitter 211 which sends pulses back to the control logic corresponding to angular position changes of lead screw 207. Likewise, platen 205 is driven by stepping motor 213 and the position of platen 205 is fed back to the control logic by emitter 215. Step motors 209 and 213 are electrically driven by control circuits 217 and 219 which include the requisite latches and current driving amplifiers to accomplish proper sequential activation of motor windings to cause the motors to move either forward or backward. Because motor 209 and drive circuitry 217 have significant inertia and time delays, motor 209 can continuously move or slew through many steps faster than it can incrementally step and stop, step and stop. For this reason, it is advantageous to permit incrementing pulses from the control logic to arrive at a faster rate when character spaces contain no picture element of an image being reproduced on paper 203. When a portion of the signature image is to be printed, slice register 221 receives a single byte of dot data from read/write memory 227. After the stepping motor 209 has stopped, the picture element represented by the byte of information in slice register 221 energizes the eight corresponding coils of print head 201 to print the picture elements.

Assuming that an image of the signature in FIG. 2 is to be printed out on paper 203, read/write memory 227 will contain a guide byte followed by five blank indicator bytes followed by a plurality of dot data bytes followed in turn by five more blank indicator bytes etc. Because only the dot data bytes of a character space corresponding to a binary one blank indicator bit are received, the number of dot data bytes will vary from line to line. In addition to read/write storage 227, a typical print terminal would include a read only storage 229 for use in generating normal characters in normal print mode and possibly also including a microprogram to control a microcomputer implementation of control logic 223. Control logic 223 addresses storage 227 and 229 via address decode 225. Bytes of control information and data are received from the host computer 11 on the data bus in DBI. Command information received on DBI is interpreted by control logic 223 to for example, store following data bytes in storage 227. Connecting the output of storage 227, 229 to control logic 223 and to slice register 221 is a data bus out DBO.

FIG. 6 thus shows the important means required to convert the essential bytes of information representing an image of a signature into picture elements at an output device such as a printer. It will be understood by those skilled in the art that step motors 209 and 213 and their associated control logic could be replaced with address counters in a display buffer memory and that the slice register 221 could be the input data register of the display buffer memory. In this manner an image of the signature could be produced in a display buffer memory as well as on paper 203. Having been reproduced in a display buffer memory, each picture element in the buffer memory can be presented on any type of display unit such as cathode ray tube or gas panel. It is however, an important feature of the invention that the image to be reconstructed at an output terminal be formatted in accordance with bytes of dot data corresponding to slices of character spaces. Further character spaces having no picture elements of the image are announced by a corresponding single binary zero bit in a corresponding blank indicator byte.

Figure 7:
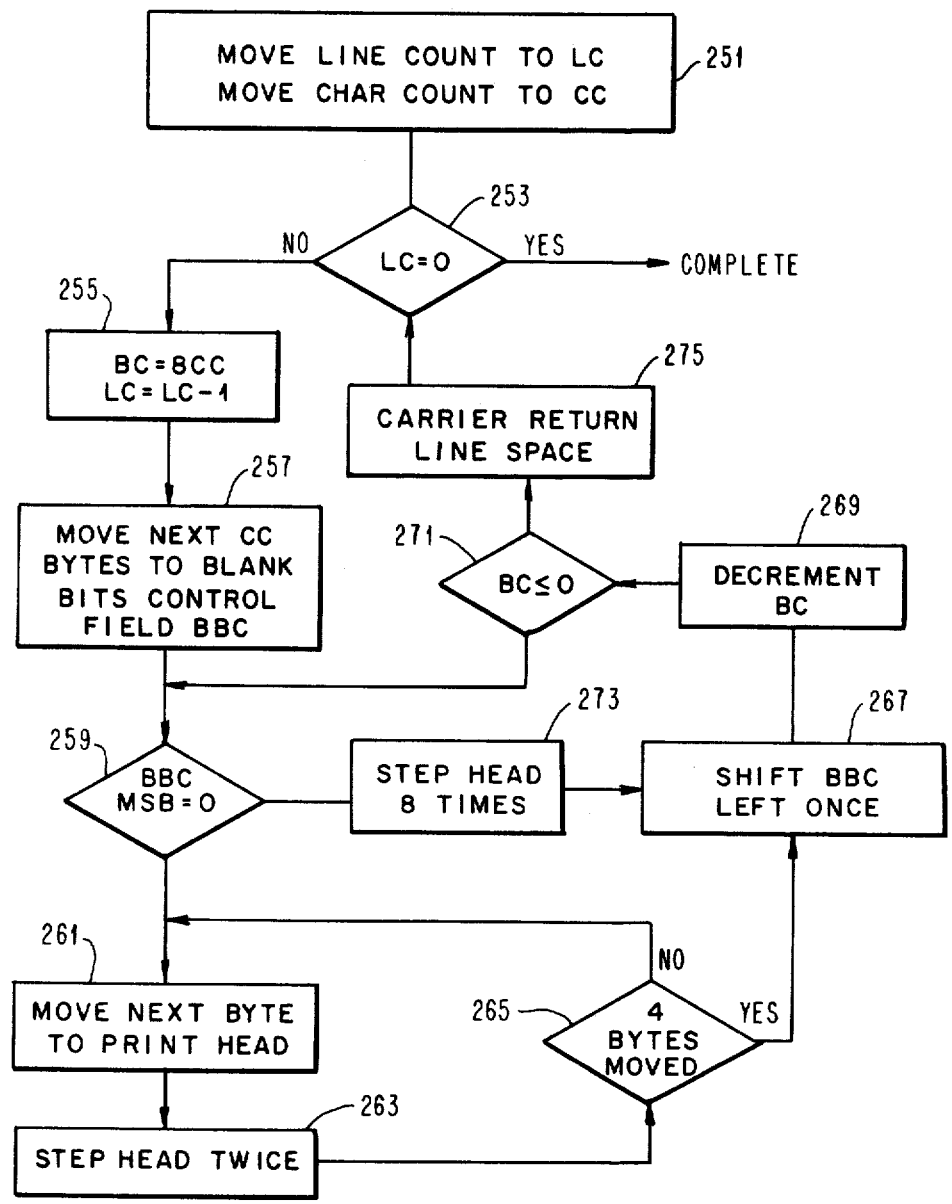
FIG. 7 is a flow diagram of the operation of the apparatus of FIG. 6.

Referring now to FIG. 7, a flow diagram is set forth defining in detail, the steps necessary to convert the contents of read/write storage 227 into an image by a matrix printer. Having received and stored at least the bytes representing the guide byte and the blank indicator bits BIB for the first line of character spaces, control can be given to control logic 223. While dot data bytes for line one and following BIB bytes etc. are being received and stored in 227, control 223 will move the number of lines field L of the guide byte into a line count control field LC and will move the number space units field U into the character space control field CC. Control fields LC and CC are retained in registers 311 and 309 of control logic 223 shown in FIG. 8 for use in controlling transfer of data from storage 227 to slice register 221. Having moved the line count and space count at action block 251, the line count is tested for zero at action block 253 and if zero, the complete image has been presented. If not zero, the line count is decremented at action block 255 and a byte count of eight times the character space count is set in register BC. In our example, five lines of character spaces are necessary to portray the image of the signature John Doe and accordingly, the line count LC is decremented from five to four. Likewise, five bytes of blank indicator bits are needed for each line or character spaces and accordingly, the next CC bytes in storage 227 are moved to the blank bit control field BBC in control logic 223 which preferably is a seven byte serial shift register as shown at 315 in FIG. 8. In this example, five bytes of blank indicator bits beginning with the byte 67 shown in FIG. 2 will be loaded in the blank bit control field. Decision block 259 examines the most significant bit of the blank bit control field which will be a one bit as shown in FIG. 2. Being a one bit, action block 261 causes the next byte in storage 227 which is a dot data byte to be moved to the output slice register 221 for printing. Because many matrix printers have nearly twice the picture element spacing in a vertical direction as compared with picture element spacing in a horizontal direction in order to more accurately print characters such as A or V, it has been chosen in this example to skip alternate possible print slice positions in order to obtain a more nearly equal horizontal and vertical picture element spacing. Accordingly, the print head is stepped twice at action block 263, but only prints one slice at the first stopping point. Decision block 265 is a counter which counts up to four in order to loop on action blocks 261 and 263 so that the four dot data bytes for the character space being printed are transferred to slice register 221. After the four bytes have been printed, control is transferred to action block 267 which shifts the blank bit control field one position to the left. Additionally, the byte count control field BC is decremented at 269 and tested at 271 for a zero condition indicating all character spaces for a line of character spaces have been presented at the output print head. If BC is greater than zero, control is returned to decision block 259 for presentation of the next character space. When a zero most significant bit of the blank bit control field is encountered, control is transferred to action block 273 which causes the output print head to step eight times, to the next character space of the print line, completely skipping the corresponding character space. Control is then passed to action block 267 where the blank bit control field is again shifted for access to the next blank indicator bit. In the event that the bit count BC is equal to or less than zero, a line of character spaces has been presented.

Accordingly at block 275, the print carrier is returned by step motor 209 to the start position of the line just completed. The paper has to be incremented by step motor 213 to the next line of character spaces. Existing line printers are often designed for printing five or six lines per inch. By stepping step motor 213, twelve steps, five lines per inch are obtained and ten steps yield six lines per inch. Thus, the step motor steps sixty steps per inch and each step is 0.0166 inches, the same as print wire spacing. Therefore, by causing control logic 223 to increment step motor 213 eight times, a second line of character spaces spaced 0.0166 inches below the first line is obtained.

From action block 275 control is returned to decision block 253 to determine whether the last line of character spaces representing the image have been presented. If not, control again returns to action block 255 where the bit count field is reset to eight times the character space count CC and the line count LC is decremented. The previously recited steps are again repeated until decision block 253 finds LC equal to zero. A complete image of the original signature has then been reproduced for the terminal operator.

Figure 8:
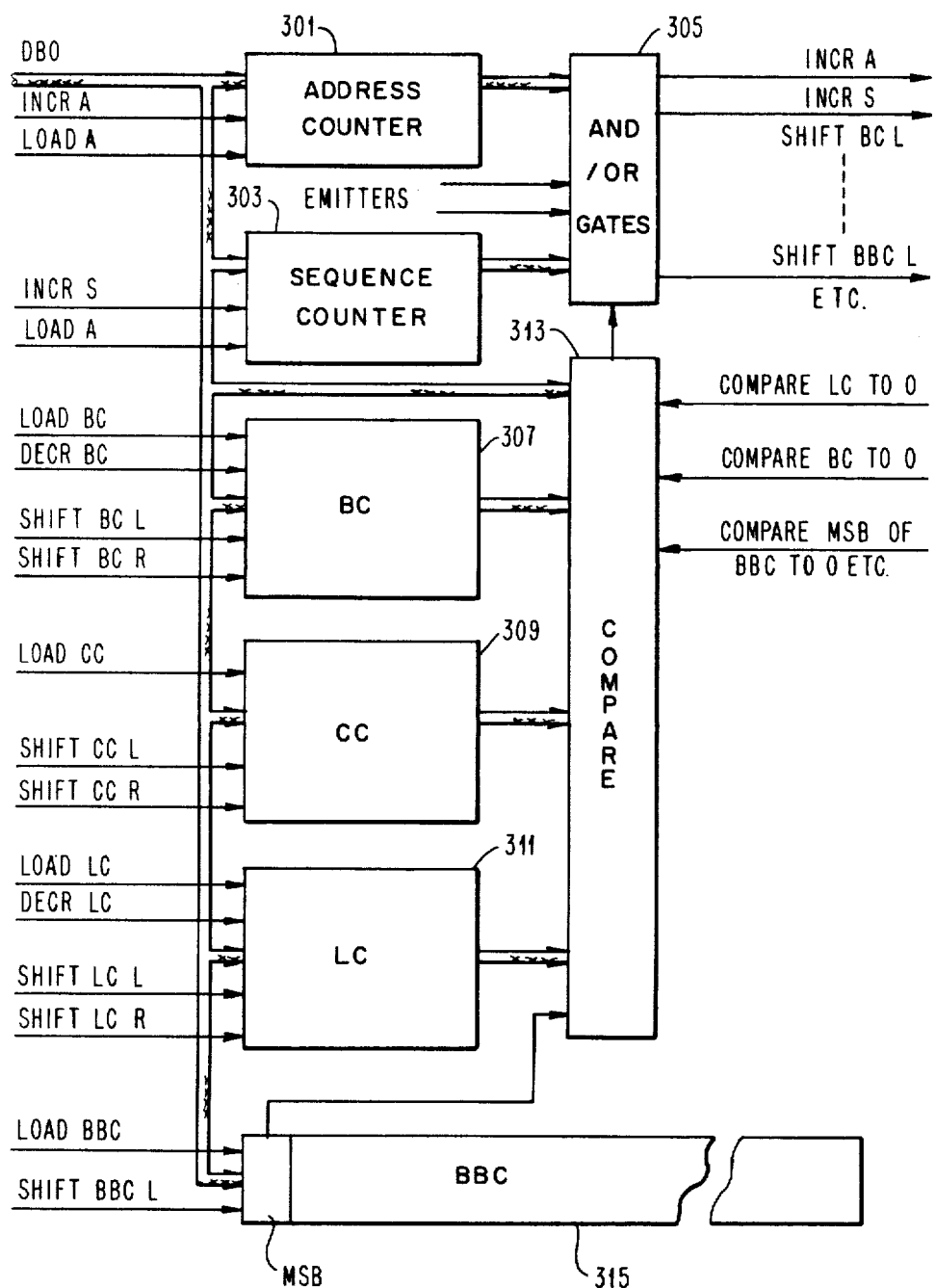
FIG. 8 is additional detail of circuit elements of control logic 223 of FIG. 6.

Referring now to FIG. 8, further details of control logic 223 of FIG. 6 are set forth. Control logic 223 primarily sequences the operating steps of printer 25 by sequencing the hardware and memory addresses. Memory addresses are generated by address counter 301 and sequence control is provided by sequence counter 303. Address counter 301 and sequence counter 303 are connected to a plurality of AND/OR gates 305 which are connected to provide the various necessary control signals to control the step motors, load slice register 221, increment the address counter and the sequence counter, load to the address counter to accomplish branch addressing, and so forth. In addition to controlling the address and sequence counters, gates 305 control the loading and shifting of byte, character, and line control field counters 307, 309 and 311 respectively, and control the loading and shifting of the blank bit control field shift register 315. The control field registers BC, CC, LC, and BBC are connected to comparator 313 which is also controlled to perform the comparisons required in FIG. 7. In summary, address counter 301 with sequence counter 303 provide input to gates 305 which may be in the form of a read only storage or program logic array which determines the personality of the terminal 25 in accordance with wiring or chip metalization patterns or other techniques within the skill of the art. Included within other techniques would be the substitution of memory for register spaces BC, CC, LC, and BBC and the substitution of a microcomputer for address counter 301, sequence counter 303 and comparator 313. In such a configuration, micro instructions would replace the personality of gates 305 and would most often be in read only storage.

While a preferred embodiment of the invention together with suggested modifications thereof have been described in detail and shown in the accompanying drawings, it will be evident that further modifications are possible without departing from the spirit and scope of the invention.

I claim:

1. A matrix printer for presenting an image of a signature, the improvement comprising:
   means for receiving and storing a count indicative of the number of lines of character spaces having a portion of said image and a count of the number of character spaces in said lines;
   means for contiguously receiving and storing a plurality of blank space indicator bits including a binary bit for each character space of a line of character spaces having a portion of said image;
   logic means responsive to said stored counts for examining each blank space indicator bit in sequence;
   stepping means controlled by said logic means to cause the print head of said printer to skip each character space position having a logical zero corresponding blank space indicator bit;
   data gates controlled by said logic means for gating slice data bytes to said print head at each character space having a logical one corresponding blank space indicator bit, said stepping means stepping said print head between each of said slice data bytes.

2. The matrix printer of claim 1 further comprising:
   line incrementing means controlled by said logic means to cause the relative position of said print head with respect to the paper to be incremented to print character spaces on a second line substantially contiguous with a first line.

3. The printer of claim 1 wherein said count of the number of character spaces in each of said lines is in the form of a byte count and wherein the number of said blank space indicator bits for each of said lines is eight times said byte count.

* * * * *